US005547233A

United States Patent [19]

Hoegger

[11] Patent Number: 5,547,233

[45] Date of Patent: Aug. 20, 1996

[54] HYDRAULIC SWIVEL HAVING SELECTIVELY HARDENED PORTIONS

[75] Inventor: Bruce A. Hoegger, Brooklyn Center, Minn.

[73] Assignee: Remanco Hydraulics, Inc., Minneapolis, Minn.

[21] Appl. No.: 37,809

[22] Filed: Mar. 24, 1993

[51] Int. Cl.[6] .......... F16L 27/10

[52] U.S. Cl. .......... 285/276; 285/422; 148/906; 384/492; 384/625

[58] Field of Search .......... 285/276, 422; 148/906, 907, 909; 384/492, 625

[56] References Cited

U.S. PATENT DOCUMENTS

| | | | |
|---|---|---|---|
| 1,482,563 | 2/1924 | Hultgren | 384/492 |
| 2,229,565 | 1/1941 | Hallowell, Jr. | 148/907 X |
| 2,384,360 | 9/1945 | Allen et al. | 285/276 X |
| 2,592,904 | 4/1952 | Jackson | 285/276 X |
| 2,746,773 | 5/1956 | Bily | 285/276 X |
| 2,910,309 | 10/1959 | Snyder et al. | 285/276 X |
| 3,275,389 | 9/1966 | Neilson et al. | 384/625 |
| 3,782,794 | 1/1974 | Chmura | 384/492 |
| 3,791,706 | 2/1974 | Dobson | 308/216 |
| 4,167,809 | 9/1978 | Boyland | 29/800 |
| 4,185,841 | 1/1980 | Brundage | 285/276 X |
| 4,355,827 | 10/1982 | Ehret | 285/276 X |
| 4,618,269 | 10/1986 | Badrak et al. | 384/625 |
| 4,696,581 | 9/1987 | Tsushima et al. | 384/492 |
| 5,013,525 | 5/1991 | Hamada et al. | 148/906 X |
| 5,112,146 | 5/1992 | Stangeland | 384/492 |
| 5,137,375 | 8/1992 | Murakami et al. . | |

FOREIGN PATENT DOCUMENTS

| | | | |
|---|---|---|---|
| 5614 | 2/1988 | Japan | 148/906 |

OTHER PUBLICATIONS

Fundamentals of Engineering by Merle C. Potter PhD. PE 3rd Ed. 1990 Chart Comparing Rockwell Hardness Scals.

E. Oberg, F. Jones & H. Horton, *Machinery's Handbook*, 539–541 (23rd ed. 1989).

18, *McGraw Hill Encyclopedia of Science & Technology*, p. 10 (6th ed. 1987).

M. Lindeburg, *E–I–T Reference Manual*, 36–9 (7th ed. 1990).

R. Lindberg, *Process & Materials of Manufacture*, 37 (3rd ed. 1983).

*Primary Examiner*—Terry Lee Melius
*Assistant Examiner*—Heather Chun Shackelford
*Attorney, Agent, or Firm*—Kinney & Lange, P.A.

[57] ABSTRACT

A device and a method for making a device for rotatably connecting fluid flow lines such that fluid is flowable between the fluid flow lines. The device has a male component which has a male portion and a female component which has a female portion. The male and female components each have flow line connecting mechanisms. The male portion fits within the female portion such that the male and female components are rotatable with respect to one another. The male portion has both hardened and unhardened regions and the female portion has a hardened region.

21 Claims, 3 Drawing Sheets

HYDRAULIC SWIVEL HAVING SELECTIVELY HARDENED PORTIONS

BACKGROUND OF THE INVENTION

The present invention relates to swivels for connecting fluid flow lines. In particular, the present invention relates to unbalanced swivels for connecting fluid flow lines.

A swivel for rotatably connecting fluid flow lines is typically a multi-component device with least two ends which are connectable to fluid flow lines. In practice, such a swivel includes a male component and a female component. The male and female components often have male and female portions, respectively, such that the male port,on fits within the female portion. Both the male and female components have one or more flow line connectors for connecting the male and female components to fluid flow lines.

The swivel must also have a mechanism for retaining the male portion within the female portion and a mechanism for reducing frictional forces between the male and female components such that the male and female components are rotatable relative to each other. It is known in the art to include bearing race portions in facing annular surfaces of the male and female portions such that a ball bearing is positionable between the male and female portions. The ball bearing thereby retains the male portion inside the female portion and also allows relative rotational movement of the male and female components.

A swivel for rotatably connecting fluid flow lines in which a flowing fluid places greater forces upon the downstream swivel components than upon the upstream swivel components is an example of an unbalanced fluid flow line connection swivel. Positioning of the ball bearing within a bearing race of the male and female components prevents the male and female components from separating due to the unbalanced fluid forces. However, it is known in the art that the unbalanced fluid forces accelerate ball bearing race wear, as compared to that of a swivel having balanced fluid forces.

One approach to solving the bearing race wear problem of unbalanced swivels has been to harden the male and female components. Hardened metal is more resistant to penetration and therefore undergoes less wear from imposed ball bearing loads than does unhardened metal. Another attempted solution to the unbalanced swivel bearing race wear problem entails hardening the male and female portions only, rather than the entirety of the male and female components.

SUMMARY OF THE INVENTION

The present invention provides an unbalanced device for rotatably connecting fluid flow lines such that fluid is flowable between the fluid flow lines. The device includes both a male component and a female component. The male and female components each include a mechanism for accepting one or more fluid flow lines such that fluid is flowable through the device. One embodiment of the mechanism includes threads.

The male and female components have a male and a female portion, respectively, such that the male portion fits within the female portion. The male and female portions each include selectively hardened regions. The male portion also includes a selectively non-hardened region. In addition, the hardened region of the male portion is located between the female portion and the non-hardened region of the male portion.

The device also includes a bearing mechanism, which in one embodiment is positioned between the male and female portions, for allowing the male and female components to rotate relative to one another. In one embodiment, the bearing mechanism includes a ball bearing positioned between the male and female portions.

DETAILED DESCRIPTION OF THE PREFERRED EMBODIMENTS

The device of the present invention is particularly suited for connecting two or more fluid flow lines such that the fluid flow lines are rotatable relative to each other. Also, selective hardening of device components lets the device accommodate unbalanced fluid forces. The device additionally permits non-axial connection of fluid flow lines.

Figure 5:
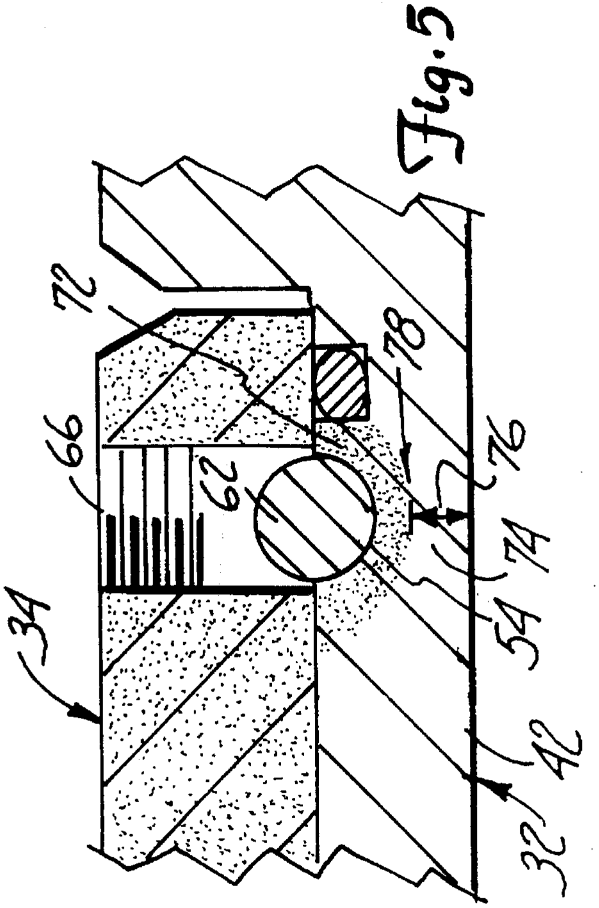
FIG. 5 is an enlarged portion of the cross-sectional view of FIG. 3 illustrating the first and second regions of the device of the present invention.
Figure 1:
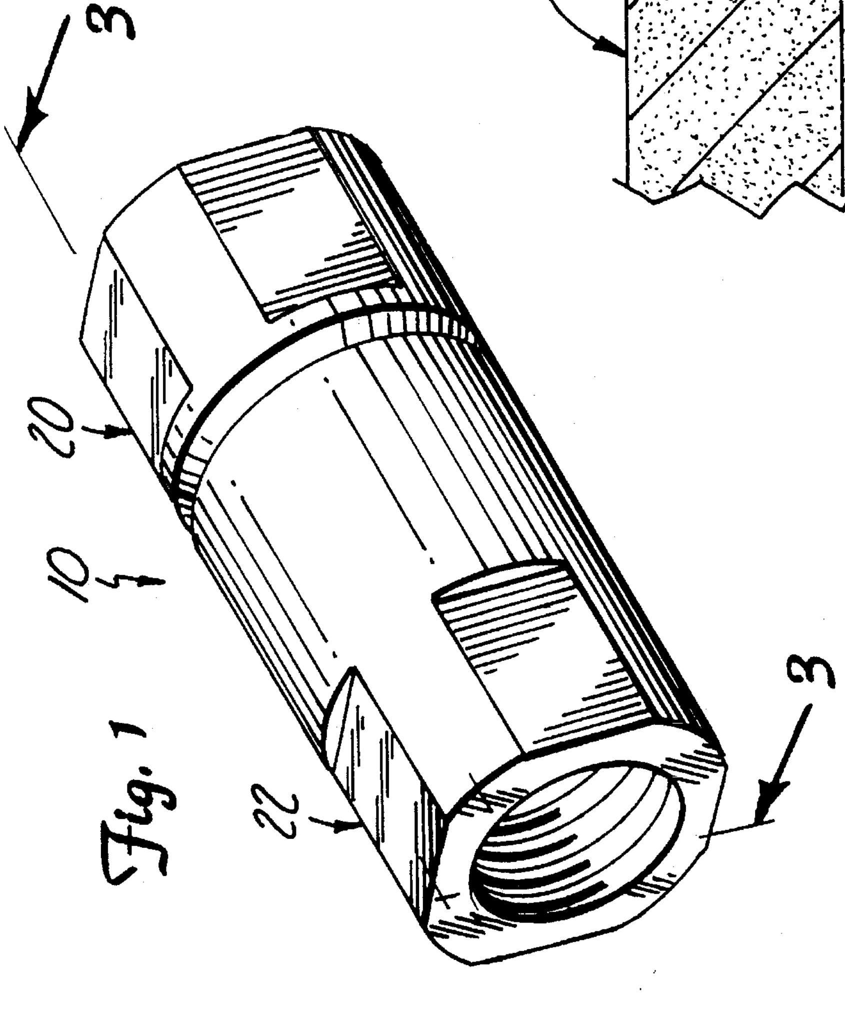
FIG. 1 is a perspective view of the device of the present invention.

Referring to FIG. 1, the device of the present invention, which preferably takes the form of a hydraulic swivel, is generally indicated at 10. The male and female components 20, 22 are made of a suitable material, typically metal, which is hardenable to specified Rockwell hardness values. In one preferred embodiment of the device, the components 20, 22 are made of metal which is cable of being hardened by inductive heating. The swivel includes a male component 20 and a female component 22.

Figure 2:
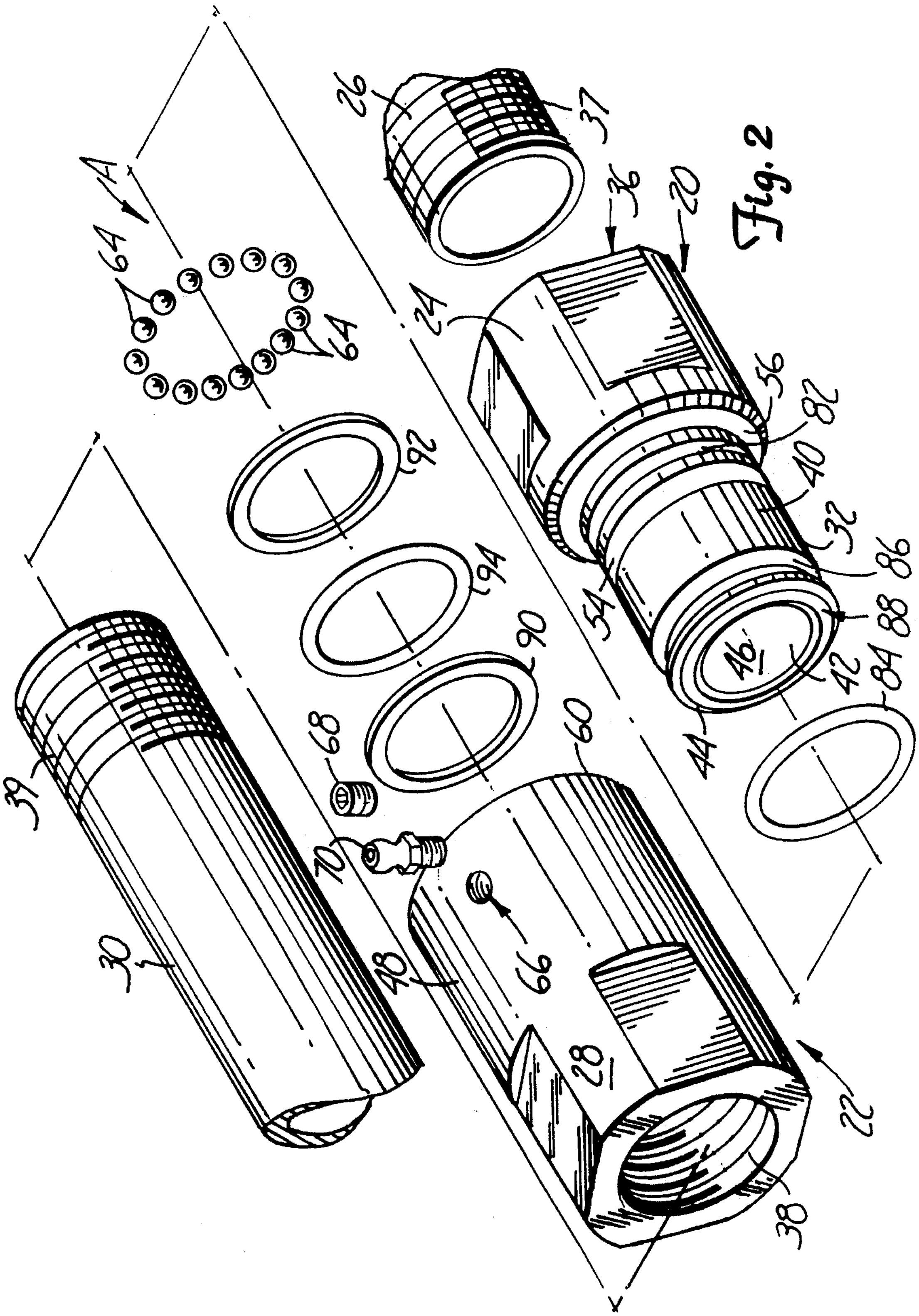
FIG. 2 is an exploded perspective view of the device of FIG. 1.

Referring to FIG. 2, the male component 20 includes a first line connection portion 24 for connecting the male component 20 to a first fluid flow line 26. The female component 22 includes a second line connection portion 28 for connecting the female component 22 to a second fluid flow line 30.

Figure 3:
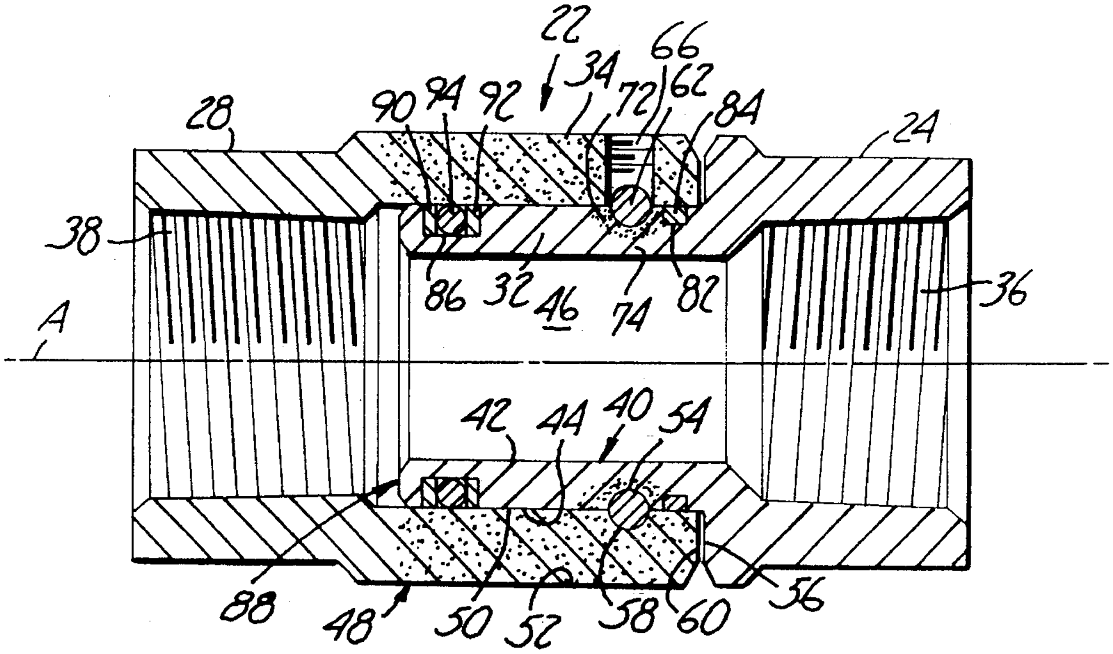
FIG. 3 is a cross-sectional view of the device of the present invention taken along line 3—3 of FIG. 1.

In one embodiment, the first line connection portion 24 and the second line connection portion 28 have female threaded bores 36 and 38, respectively, for securely accepting male threaded ends 37 and 39, respectively, of the first fluid flow line 26 and the second fluid flow line 30, respectively. Those skilled in the art will readily recognize that numerous other mechanisms for connecting the line connection portions and the fluid flow lines are within the scope of this invention. Additionally, the male component 20 includes a male portion 32 and, as best illustrated in FIG. 3, the female component 22 includes a female portion 34.

Figure 4:
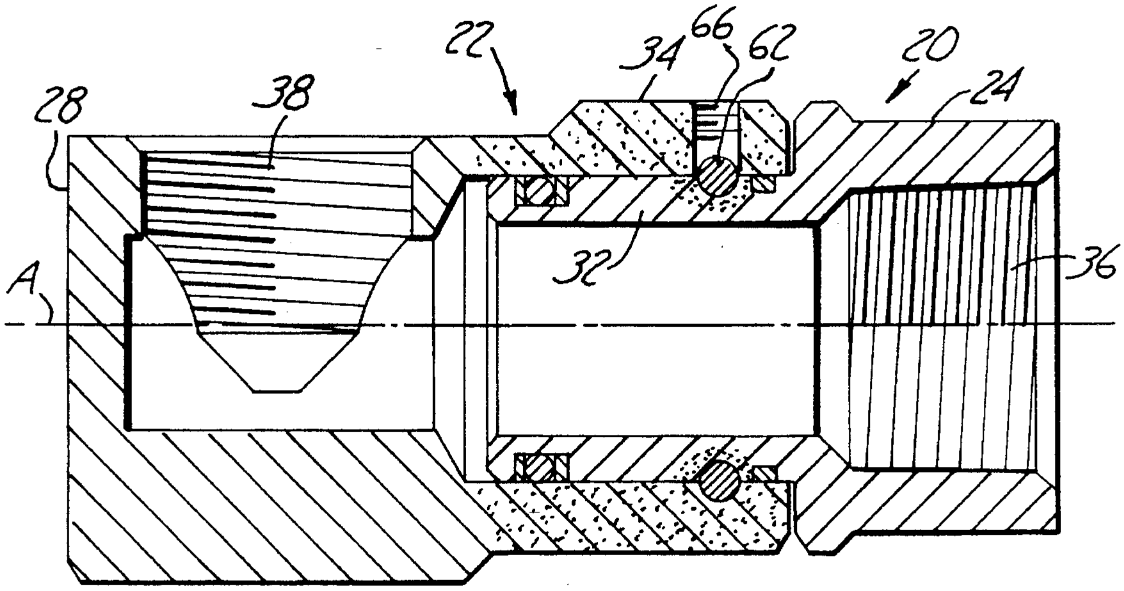
FIG. 4 is a cross-sectional view of another embodiment of the device of the present invention.

In a preferred embodiment, the first and second line connection portions 24, 28 are coaxially oriented along a common axis A when the male component 20 and the female component 22 are connected. In another embodiment of FIG. 4, the first line connection portion 24 is centered along the axis A, but the second line connection portion 28 is disposed substantially perpendicular to the first line connection portion 24 and to the axis A.

Referring back to FIGS. 2 and 3, the male portion 32 preferably includes a substantially cylindrical body portion 40 having an inner annular surface 42 and an outer annular surface 44. The inner annular surface 42 defines a chamber 46 through which fluid flows between the first and second fluid flow lines 26, 30 or between the second and first fluid flow lines 30, 26. The male portion 32 is situated adjacent to and coaxially with the first line connection portion 24 in one preferred embodiment.

The female portion 34 preferably also includes a substantially cylindrical body portion 48 with an inner annular surface 50 and an outer annular surface 52. The inner annular surface 50 defines an inner diameter of the female portion 34, and the outer annular surface 44 defines an outer diameter of the male portion 32. The inner diameter of the female portion and the outer diameter of the male portion 32 are substantially the same such that the male portion 32 slidably fits inside the female portion 34, with the outer annular surface 44 being adjacent to the inner annular surface 50.

The male portion 32 includes a first bearing race portion 54 located in the outer annular surface 44 proximate a ledge 56 where the male portion 32 and the first line connection portion 24 meet. The female portion 34 includes a second bearing race portion 58 near an end 60 of the female portion 34 which is farthest from the second line connection portion 28. The first bearing race portion 54 and the second bearing race portion 58 are disposed on the male and female portions, respectively, such that the first bearing race portion 54 and the second bearing race portion 58 match up in mirror image fashion when the male portion 32 and the female portion 34 are joined.

Together, the first bearing race portion 54 and the second bearing race portion 58 define a ball bearing race 62 into which a plurality of ball bearings 64 movingly fit. The female portion 34 includes a ball bearing loading hole 66 extending from the outer annular surface 52 to the second bearing race portion 58. Either a retaining bolt 68 or a grease zerk 70 is fitted into the ball bearing loading hole 66 to retain the ball bearings 64 within the ball bearing race 62.

The ball bearings 64 serve at least two roles. The ball bearings 64 prevent the formation of excessive friction between the outer annular surface 44 and the inner annular surface 50 such that the male component 20 and the female component 22 are rotatable with respect to one another. The ball bearings 64 thereby also allow the first fluid flow line 26 and the second fluid flow line 30 to rotate with respect to one another.

Also, the hydraulic swivel 10 of the present invention is an unbalanced swivel. An unbalanced swivel is one in which flowing fluid places greater forces upon downstream device components than upon upstream device components. Therefore, in another important role, the ball bearings 64 prevent the male portion 32 and the female portion 34 from separating due to the unbalanced forces. Specifically, the ball bearings 64 prevent the male component 20 and the female component 22 from shifting relative to each other along the axis A.

If left unchecked, the rolling forces imparted to the swivel 10 consonant with the rotation of the male component 20 and the female component 22 relative to each other and the separation forces imparted to the swivel 10 consonant with the differential fluid forces placed upon the male and female components typically cause significant wear within the ball bearing race 62. Such ball bearing race wear eventually inhibits the male component 20 and the female component 22 from rotating with respect to each other and sometimes allows the male component 20 and the female component 22 to separate. Thus, ball bearing race wear will ultimately cause hydraulic swivels 10 to be functionally useless.

A traditional solution to the ball bearing race wear problem is hardening the male component 20 and the female component 22 so the first bearing race portion 54 and the second bearing race portion 58 are more resistent to penetration. The theory is that such hardening extends device life by reducing wear from imposed ball bearing loads, as compared to unhardened swivels, since hardened metal is more resistant to penetration.

However, it was discovered that hardening of the male 20 and female 22 components does not solve all problems. Instead, practice has shown that complete hardening of the male 20 and female 22 components often results in breakage of the components 20 and 22, especially proximate the male threaded bores 36, 38, rather than yielding a satisfactory service life. It is believed that the hardening process is the source of the threaded bore breakage problem.

Another possible approach to the bearing race wear problem of unbalanced swivels 10 involves hardening the male 32 and female 34 portions only, rather than the entirety of the male 20 and female 22 components. This decreased hardening scope solves the above-noted thread breakage problem, but raises another problem. Hardening the entire male portion 32 sometimes causes the male portion 32 to break proximate the bearing race 62, rather than lasting its designed service life. It is believed that this breakage problem is caused by either the hardening process, inexact control of the hardening process, non-homogeneous metal compositions, or a combination including each of these factors.

It was discovered that hardening of substantially the entire female portion 34 accompanied by selective hardening of the male portion 32 proximate the bearing race 62 provides the desired resistance to imposed ball bearing loads, while avoiding the aforementioned threaded bore breakage problem and the male portion breakage problem. Therefore, in the preferred embodiment, the female portion 34 is hardened in its entirety to a Rockwell A-scale hardness of between approximately 78.0 and 76.8 and a first region 72 of the male portion 32 is hardened to a Rockwell A-scale hardness of between approximately 78.5 and 77.4.

It was found that increased hardening of the female portion and of the first region of the male portion above the specified Rockwell Hardness ranges sometimes resulted in a chipping problem within the bearing race 62. Decreased hardening below that specified significantly reduced bearing race 62 wear resistance.

Induction hardening of the female portion 34 and the first region 72 of the male portion 32 was found to be the preferred hardening process. Induction hardening yields the preferred combination of hardening process controllability and time and cost effectiveness.

Induction hardening of work pieces, including induction hardening of select portions of work pieces, is well known in the art. See E. Oberg, F. Jones & H. Horton, *Machinery's Handbook*, 539–541 (23rd ed. 1989) and 18, *McGraw Hill Encyclopedia of Science & Technology*, 10 (6th ed. 1987). According to the present invention, the female portion 34 and the first region 72 are selectively heated to the austenitizing temperature of the metal, using conventional electromagnetic induction techniques. The female portion 34 and the first region 72 are then hardened by spray quenching them with a conventional synthetic polymer-containing quench liquid. Next, using conventional techniques know in the art, the female portion 34 and the first region 72 are tempered in an oven to produce the specified hardness.

The Rockwell Hardness Test measures "the capacity of a surface to resist deformation" and is primarily used to quantify and "verify heat treatments." M. Lindeburg, *E-I-T-Reference Manual*, 36–9 (7th ed. 1990). The Rockwell Hardness Test involves "measuring the difference in depth of penetration" of a minor load versus a major load in the test material using the Rockwell Hardness Tester. R. Lindberg, *Processes & Materials of Manufacture*, 37 (3rd ed. 1983). The standards and the procedures for running the Rockwell Hardness Test, and therefore for determining the hardness of a part on either the Rockwell A or C scales, are known and practiced in the art according to American Society of Testing Methods (ASTM) Standard No. E-18.

The first region 72 is oriented adjacent the first bearing race portion 54 and fully encompasses the first bearing race portion 54 in annular fashion about the axis A. The hardening of the first region 72 is accomplished such that a second region 74 of the male portion 32 remains unhardened. Located proximate the first bearing race portion 54, the second region 74 is defined by an annular width 76 about the axis A, with the width 76 extending from the inner annular surface 42 to a boundary 78 which separates the first region 72 and the second region 74. The second region 74 is not defined or limited by the annular width 76 in areas not proximate the first bearing race portion 54 where the first region 72 does not exist. Preferably, the annular width 76 is not less than 0,005 inches thick.

Preferably, the male component 20 includes a first seal race 82 in the outer annular surface 44 of the male portion 32, between the first bearing race portion 54 and the ledge 56. A grease/dust seal 84 is positioned within the first seal race 82 such that the grease/dust seal 84 will abut against the inner annular surface 50 of the female portion 34 to provide a seal against foreign material and grease when the male portion 32 is positioned within the female portion 34.

In one embodiment, the grease/dust seal 84 is made from a nitryl rubber elastomer such as Buna-N®. Buna-N® grease/dust seals are available from Wynn's Precision Rubber Products Co. of Lebanon, Tenn. In another embodiment, the grease/dust seal 84 is made of a fluoro-elastomer such as Viton®, which is available from E. I. dupont de Nemours & Co. of Wilmington, Del.

Another preferred embodiment includes a second seal race 86 proximate an end 88 of the male portion 32, opposite the first line connection portion 24, and disposed in the outer annular surface 44 of the male portion 32. In the second seal race 86, a wiper ring 90 is positioned closest to the end 88 and a back-up ring 92 is positioned farthest from the end 88. An O-ring pressure seal 94 is also positioned within the second seal race 86 between the wiper ring 90 and the back-up ring 92. The wiper ring 90, the O-ring pressure seal 94 and the back-up ring 92 are positioned within the second seal race 86 such that they will abut against the inner annular surface of the female portion 34 to provide a seal against foreign material and grease when the male portion 32 is positioned within the female portion 34.

In one embodiment, the wiper ring 90 and the back-up ring 92 are made of a polyester copolymer elastomer such as Hytrel®, which is available from E. I. dupont de Nemours & Co. of Wilmington, Del. The wiper ring 90 and the back-up ring 92 can also be made of a tetrafluoroethylene-based polymer, such as Teflon®, which is also available from E. I. dupont de Nemours & Co. of Wilmington, Del.

The O-ring pressure seal 94 is preferably made of a fluoro-elastomer such as Viton®, which is available from E. I. dupont de Nemours & Co. of Wilmington, Del. Other preferred materials for the O-ring pressure seal 94 include a polytetrafluoroethylene encapsulated fluoro-elastomer, such as Teflon® encapsulated Viton®, or a glass-based material such as Aflas®. Teflon® encapsulated Viton® is available from E. I. dupont de Nemours & Co. of Wilmington, Del. Aflas® is available from Asahi Glass America, Inc. of New York, N.Y.

The method of manufacturing the swivel device of the present invention includes supplying the male component 20 having the first line connection portion 24 and the male portion 32. The method further includes providing the first bearing race portion 54, the first seal race 82 and the second seal race 86 in the outer annular surface 44 of the male portion 32. In addition, the method includes providing the female component 22 with the second line connection portion 28 and the female portion 34. Also, the second bearing race portion 58 must be provided within the inner annular surface 50 of the female portion 34.

Furthermore, the female portion 34 must be hardened to the specified Rockwell A-scale hardness using induction hardening, as previously described in this document. Also, the first region 72 of the male portion 32 must be hardened proximate the first bearing race portion 54 to the specified Rockwell A-scale hardness using induction hardening, taking care not to harden the second region 74 of the male portion 32.

Furthermore, the grease/dust seal 84 must be placed within the first seal race 82 and the wiper ring 90, the O-ring seal 94, and the back-up ring 92 must be placed within the second seal race 86 such that the back-up ring 92 is positioned closer to the end 88 of the male portion 32, as compared to the back-up ring 92 and the O-ring seal 94, and such that the O-ring seal 94 is positioned between the wiper ring 90 and the wiper ring 90. This ring and seal placement typically occurs after the first region 72 of the male portion 32 is hardened.

Finally, the male portion 32, with the rings 90 and 92 and the seals 84 and 94 in place, is inserted into the female portion 34 such that the first bearing race portion 54 and the second bearing race portion 58 match up to define the ball bearing race 62. Next, the ball bearings 64 are placed into the ball bearing race 62 using the ball bearing loading hole 66. After the ball bearings are placed into the ball bearing race 62, the ball bearings are greased, if so desired, and the retaining bolt 68 or grease zerk 70, as appropriate, is placed into the ball bearing loading hole 66.

The present invention provides an improved unbalanced device 10, preferably taking the form of a hydraulic swivel, which accomplishes each of the benefits and advantages noted above. The hydraulic swivel 10 is selectively hardened such that the bearing race 62 is resistant to wear from imposed ball bearing loads. The female portion and part of the male portion, rather than the entire male and female component, are hardened to avoid the thread breakage problem in the threaded bores 36 and 38. More specifically, the second region 74 of the male portion 32 is purposely left unhardened to avoid the male portion breakage problem which appears when the male portion is more extensively hardened.

The hydraulic swivel 10 of the present invention provides a reliable, wear-resistant hydraulic swivel capable of withstanding imposed ball bearing loads over a significant service life. Additionally, manufacture of the hydraulic swivel of the present invention is straight-forward and inexpensive, especially considering its advantages over other unbalanced devices for rotatably connecting fluid flow lines.

Although the present invention has been described with reference to preferred embodiments, workers skilled in the art will recognize that changes may be made in form and detail without departing from the spirit and scope of the invention.

What is claimed is:

1. A device for rotatably connecting fluid flow lines such that fluid is flowable between the fluid flow lines, the device comprising:

a male component having:

a first means for accepting a fluid flow line and a male portion having a hardened region with an A-scale Rockwell hardness of between approximately 78.5 and 77.4;

a female component having:

a second means for accepting a fluid flow line and a female portion which is capable of accepting the male portion, with the female portion having an A-scale Rockwell hardness of between approximately 78 and 76.8; and bearing means for allowing relative rotational motion between the male and female components.

2. The device of claim 1 wherein the bearing means comprises a ball bearing.

3. The device of claim 2 wherein the ball bearing has a C-scale Rockwell hardness of between approximately 60.5 and 59.5.

4. The device of claim 1 wherein the hardened region encompasses a bearing race portion of the male portion, and further comprising a non-hardened region of the male portion wherein the hardened region is located between the non-hardened region and the female portion.

5. The device of claim 1 wherein the male portion comprises a substantially hollow cylinder having inner and outer surfaces and wherein the outer surface is located between the female portion and the inner surface.

6. The device of claim 5 wherein the hardened region encompasses a bearing race portion of the male portion and is proximate the outer surface, and further comprising a non-hardened region of the male portion wherein the non-hardened region is located proximate the inner surface, such that the hardened region is located between the non-hardened region and the female portion.

7. The device of claim 1 wherein the female portion and the hardened region of the male portion are hardened using induction heating.

8. The device of claim 1 wherein the first and second means for accepting a fluid flow line comprise threads.

9. A device for rotatably connecting fluid flow lines such that fluid is flowable between the fluid flow lines, the device comprising:

a female component having:

a first means for accepting a first fluid flow line and a female portion with a hardened region;

a male component having:

a second means for accepting a second fluid flow line;

an inner annular surface defining a bore within the male component, the bore capable of being placed in fluid communication with the second fluid flow line; and a male portion with a hardened region and a non-hardened region and wherein the hardened region of the male portion is located between the female portion and the non-hardened region and between the female portion and the bore and the female portion is capable of accepting the male portion; and bearing means for allowing relative rotational motion between the male and female components.

10. The device of claim 9 wherein the bearing means comprises a ball bearing.

11. The device of claim 10 wherein the ball bearing has a C-scale Rockwell hardness of between approximately 60.5 and 59.5.

12. The device of claim 9 wherein the male portion comprises a substantially hollow cylinder having inner and outer surfaces and wherein the outer surface is closer to the female portion than to the inner surface.

13. The device of claim 12 wherein the hardened region of the male portion encompasses a bearing race portion of the male portion, proximate the outer surface, and wherein the non-hardened region is located proximate the inner surface.

14. The device of claim 9 wherein the hardened region of the female portion is hardened using induction heating.

15. The device of claim 9 wherein the hardened region of the female portion encompasses substantially all of the female portion.

16. The device of claim 9 wherein the hardened region of the male portion is hardened using induction heating.

17. The device of claim 9 wherein the hardened region of the male portion has an A-scale Rockwell hardness of between approximately 78.5 and 77.4 and the hardened region of the female portion has an A-scale Rockwell hardness of between approximately 78 and 76.8.

18. The device of claim 9 wherein the first and second means for accepting the fluid flow line comprises threads.

19. A device for rotatably connecting fluid flow lines such that fluid is flowable between the fluid flow lines, the device comprising:

a female component having:

a first means for accepting a first fluid flow line and a female portion with a hardened region, the hardened region of the female portion encompassing substantially all of the female portion;

a male component having:

a second means for accepting a second fluid flow line;

an inner annular surface defining a bore within the male component, the bore capable of being placed in fluid communication with the second fluid flow line; and a male portion with a hardened region and a non-hardened region and wherein the hardened region of the male portion is located between the female portion and the non-hardened region and between the female portion and the bore and the female portion is capable of accepting the male portion; and bearing means for allowing relative rotational motion between the male and female components.

20. A device for rotatably connecting fluid flow lines such that fluid is flowable between the fluid flow lines, the device comprising:

a female component having:

a first means for accepting a fluid flow line and a female portion with a hardened region, the hardened region of the female portion having an A-scale Rockwell hardness of between approximately 78 and 76.8;

a male component having:

a second means for accepting a fluid flow line and a male portion with a hardened region and a non-hardened region and wherein the hardened region of the male portion is located between the female portion and the non-hardened region and the female portion is capable of accepting the male portion; and bearing means for allowing relative rotational motion between the male and female components.

21. A device for rotatably connecting fluid flow lines such that fluid is flowable between the fluid flow lines, the device comprising:

a female component having:

a first means for accepting a fluid flow line and a female portion with a hardened region;

a male component having:

a second means for accepting a fluid flow line and a male portion with a hardened region and a non-hardened region, the hardened region of the male portion having an A-scale Rockwell hardness of between approximately 78.5 and 77.4, and wherein the hardened region of the male portion is located between the female portion and the non-hardened region and the female portion is capable of accepting the male portion; and bearing means for allowing relative rotational motion between the male and female components.

* * * * *

UNITED STATES PATENT AND TRADEMARK OFFICE

CERTIFICATE OF CORRECTION

PATENT NO. : 5,547,233

DATED : AUGUST 20, 1996

INVENTOR(S) : BRUCE A. HOEGGER

It is certified that error appears in the above-indentified patent and that said Letters Patent is hereby corrected as shown below:

Col. 1, line 15, delete "port,on", insert --portion--

Col. 5, line 30, delete "0,005", insert --0.005--

Col. 5, lines 44, 62 & 66, delete "dupont", insert --duPont--

Col. 6, lines 3 & 8, delete "dupont", insert --duPont--

Signed and Sealed this

Fourteenth Day of January, 1997

Attest:

BRUCE LEHMAN

*Attesting Officer*

*Commissioner of Patents and Trademarks*